United States Patent [19]
Luken, Jr.

[11] Patent Number: 5,317,682
[45] Date of Patent: May 31, 1994

[54] PARAMETRIC CURVE EVALUATION METHOD AND APPARATUS FOR A COMPUTER GRAPHICS DISPLAY SYSTEM

[75] Inventor: William L. Luken, Jr., Ulster Park, N.Y.

[73] Assignee: International Business Machines Corporation, Armonk, N.Y.

[21] Appl. No.: 6,713

[22] Filed: Jan. 21, 1993

Related U.S. Application Data

[63] Continuation of Ser. No. 821,246, Jan. 10, 1992, abandoned, which is a continuation of Ser. No. 426,912, Oct. 24, 1989, abandoned.

[51] Int. Cl.$^5$ ............................................. G06F 15/62
[52] U.S. Cl. .................................. 395/142; 395/143; 395/162; 395/163
[58] Field of Search ............................ 395/140-143, 395/162-163, 134; 364/518, 521

[56] References Cited

U.S. PATENT DOCUMENTS

| | | | |
|---|---|---|---|
| 4,760,548 | 7/1988 | Baker et al. | 364/718 |
| 4,855,935 | 8/1989 | Lien et al. | 364/521 |
| 4,912,659 | 3/1990 | Liang | 364/521 |
| 4,999,789 | 3/1991 | Fiasconaro | 395/134 X |

FOREIGN PATENT DOCUMENTS 0314335 3/1988 European Pat. Off. .
0277832 10/1988 European Pat. Off. .

OTHER PUBLICATIONS

Piegl et al., "Curve and Surface Constructions Using Rational B-Splines", *Computer Aided Design*, col. 19, No. 9, Nov. 1987, pp. 485-498.

*Primary Examiner*—Gary V. Harkcom
*Assistant Examiner*—Almis Jankus
*Attorney, Agent, or Firm*—Mark S. Walker; William A. Kinnaman, Jr.

[57] ABSTRACT

A method and apparatus for evaluating and rendering parametric curves such as non-uniform rational b-spline (NURBS) curves. NURBS data consisting of control point data, knot values and other data defining a curve is stored in system memory as a sequence of records such that successive spans of the curve are defined by successive individual data records in conjunction with a predetermined number of immediately preceding data records of the sequence. A graphics control processor transforms the control point data from modelling coordinates to view coordinates, converts the transformed control point data to homogeneous coordinates, and generates parameter points along the curve. Parallel floating point processors simultaneously evaluate the homogeneous coordinates of the curve at each parameter point along the curve using the Cox-de Boor procedure. A further floating point processor converts the homogeneous coordinates to geometric coordinates for subsequent rendering and display of the curve.

22 Claims, 12 Drawing Sheets

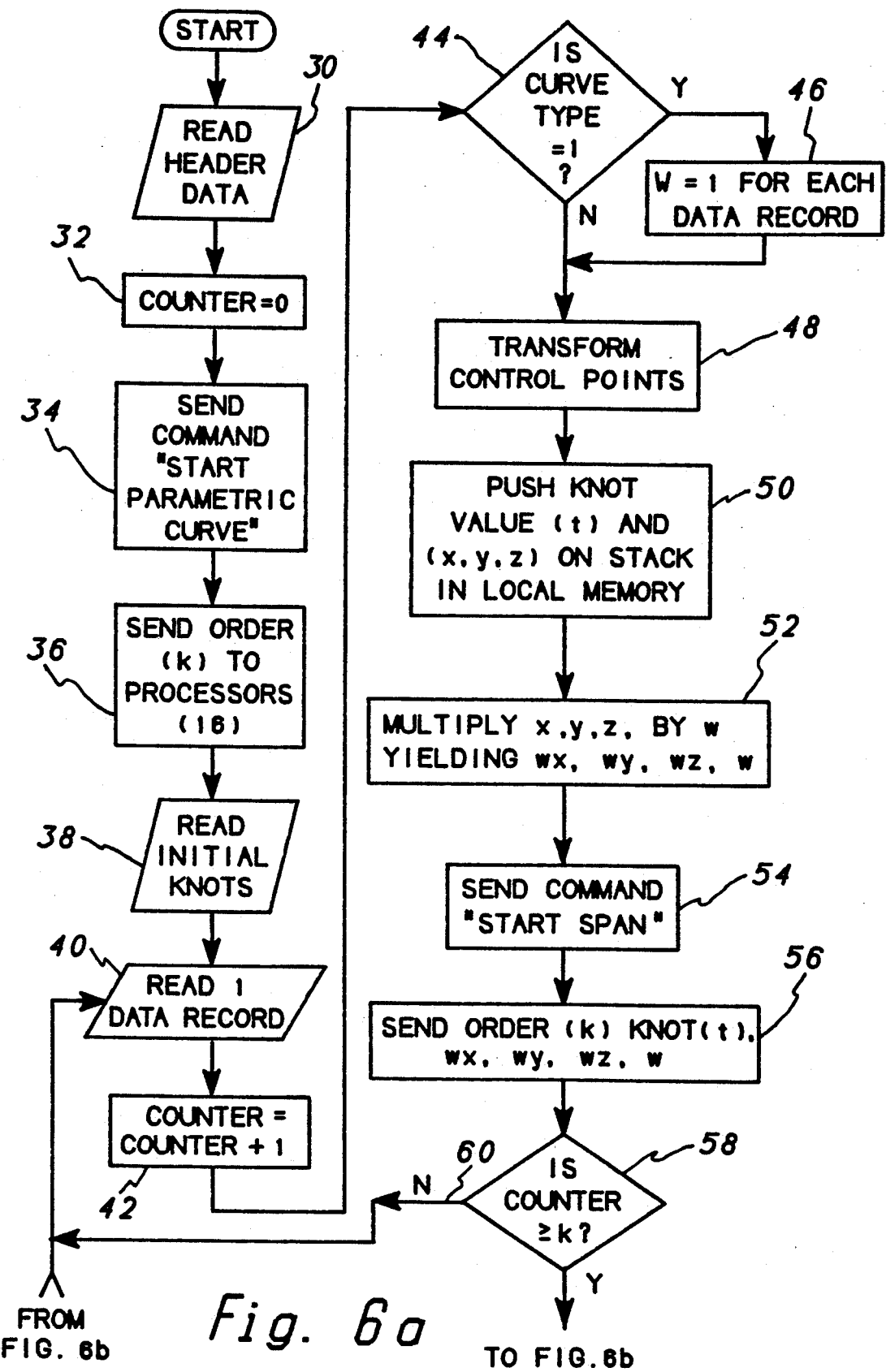

FIG. 7a

| | KNOTS |
|---|---|
| $t_3$ | k-1 |
| $t_2$ | 2 |
| $t_1$ | 1 |
| | |
| | |
| | |

| | KNOTS |
|---|---|
| $t_4$ | k |
| $t_3$ | k-1 |
| $t_2$ | 2 |
| $t_1$ | 1 |
| | |
| | |

| | KNOTS |
|---|---|
| $t_6$ | 2k-1 |
| $t_5$ | 2k-2 |
| $t_4$ | 2k-3 |
| $t_3$ | k |
| $t_2$ | k-1 |
| $t_1$ | 2 |

| | KNOT | x | y | z |
|---|---|---|---|---|
| ROW 1 | k | x(1) | y(1) | z(1) |
| | ///// | ///// | ///// | ///// |
| | ///// | ///// | ///// | ///// |
| | ///// | ///// | ///// | ///// |

| | | KNOT | x | y | z |
|---|---|---|---|---|---|
| | ROW 4 | 2k-1 | x(k) | y(k) | z(k) |
| | ROW 3 | 2k-2 | x(k-1) | y(k-1) | z(k-1) |
| $T_2$ | ROW 2 | 2k-3 | x(k-2) | y(k-2) | z(k-2) |
| $T_1$ | ROW 1 | k | x(1) | y(1) | z(1) |

49

PARAMETRIC CURVE EVALUATION METHOD AND APPARATUS FOR A COMPUTER GRAPHICS DISPLAY SYSTEM

This application is a continuation of application Ser. No. 07/821,246, filed Jan. 10, 1992, now abandoned, which in turn is a continuation of application Ser. No. 07/426,912 filed Oct. 24, 1989, now abandoned.

BACKGROUND OF THE INVENTION

1. Field of the Invention

This invention relates generally to the field of computer graphics, and more specifically to an apparatus and method for evaluating and rendering parametric curves.

2. Background Art

The evolution of computer technology has resulted in the creation of a sophisticated technical art devoted to the representation of graphical information generated by computers. This art is referred to as computer graphics. In recent years, the use of 3-dimensional computer graphics in scientific and engineering applications has increased, along with the demand for realistic images.

Besides lines, markers and polygons, computer graphics displays today support more general geometric primitives, such as parametric curves. However, the methods used, at present, for evaluating and rendering curves in such computer graphics display systems are often inefficient and require complicated and extensive external control logic.

It is known that parametric curves can be represented in b-spline form and others have attempted, in the past, to evaluate and render curves therefrom. For example, a conventional CAD/CAM application uses a graphics workstation by sending down polylines which make up a curve stored in the host computer data base, as a b-spline curve. According to this procedure, the host computer decomposes the spline curve into straight vectors, and then sends the vectors to the graphics workstation for conventional processing and subsequent display. This procedure is inefficient and fails to take advantage of the many attractive attributes of the b-splines.

U.S. Pat. No. 4,760,548 describes a method and apparatus of providing a visual representation of a curve wherein curve data is provided by a b-spline equation computed with a forward difference technique using scaled integer variables. However, this approach suffers from a number of drawbacks. It supports only uniform non-rational b-splines, a subset of the broader class of non-uniform rational b-splines (NURBS) and cannot effectively render certain curves such as circles. This earlier approach operates on individual spans of a curve in isolation from neighboring spans and depends on integer arithmetic to avoid accumulation of errors obtained when using floating point arithmetic for the forward difference algorithm. There are significant penalties in terms of efficiency, speed and utility associated with these limitations.

U.S. Pat. No. 4,855,935 describes a "Method and Apparatus For Rendering Vectors Using Bresenham Parameters." This approach, like the one in U.S. Pat. No. 4,760,548 does not support NURBS, is strongly dependent on the forward difference algorithm, operates on individual spans in isolation from neighboring spans, depends on integer arithmetic, seems specific to the cubic form and, further, converts a curve directly to single pixels.

None of the known prior art approaches fully capitalize on NURBS data in evaluating and rendering parametric curves. Accordingly, a need exists for a method and apparatus for evaluating and rendering NURBS data representative of a parametric curve, in an efficient, accurate and rapid fashion. The proposed PHIGS (Programmer's Hierarchical Interactive Graphics Standard) PLUS standard for interactive 3-d graphics, supports the definition of curves in terms of NURBS and, thus, reinforces this need.

SUMMARY OF THE INVENTION

This need is satisfied and additional benefits realized, in accordance with the principles of the present invention, by the provision of a curve evaluation system which organizes and locates in memory, NURBS data representative of a multispan parametric curve of order k, as a sequence of data records. The data records in the sequence are arranged such that successive spans of the curve are defined by successive individual records in conjunction with a plurality of immediately preceding prior data records of the sequence. Data records are read in sequence by a graphics control processor, which selectively passes the NURBS data and commands to a pipelined arrangement of floating point processors. The pipelined arrangement includes four parallel processors having their outputs connected to the input of a further processor. The parallel processors serve to simultaneously evaluate the b-spline functions for individual components of a set of homogeneous coordinates (wx, wy, wz, w) at determined parameter points along the curve. The further floating point processor converts the homogeneous coordinates to geometric coordinates for subsequent rendering of the curve on a screen of the graphics display system.

In a more particular aspect of the invention, the graphics control processor also transforms control points associated with the parametric curve from modeling coordinates to view coordinates, converts the transformed control point coordinates to homogeneous coordinates, determines a parametric coordinate interval for tessellating the parametric curve, and generates a series of interval spaced parameter points to be used in the evaluation.

In a preferred embodiment of the invention, the parallel floating point processors implement a Cox-DeBoor process in performing evaluation. One of the parallel processors provides a weight output for each parameter point evaluated and the further floating point processor calculates the reciprocal of the weight and multiplies the reciprocal by the outputs of the three remaining parallel processors to obtain the geometric coordinates. A clipping processor and frame buffer can advantageously be arranged in series with the output of the further floating point processor and operate in pipeline fashion therewith.

In another aspect of the invention, the NURBS data is arranged in the following sequence to allow sharing of such data by successive spans of a complex curve:

a first sequence portion specifying the order k and number of control points n of the curve;

a second sequence portion comprising knot values for the first through the $k-1$ knots of the curve;

a third sequence portion comprising $k-1$ successive sets of data, each set comprising coordinates and an associated weight w for a control point and a knot value, the data sets including data for the first through k−1 control points and k through 2k−2 knots of the curve;

a fourth sequence portion comprising n−k additional successive sets of data, these data sets including data for the k through n control points and 2k−1 through n+k−1 knots of the curve, and tesselation parameters 1 through n−k+1; and a fifth sequence portion comprising a n+k knot value.

The apparatus and method for evaluating and rendering parametric curves based on NURBS, of the present invention, offers many advantages including high performance, good numerical stability, cost effectiveness, high speed and accuracy, greater control over the curves, compatibility with the proposed PHIGS PLUS standard, and the elimination of data redundancy. Further the present invention allows a computer graphics display system to fully capitalize on the inherent characteristics and advantages of NURBS, including such features as the ability to construct complex curves using low order NURBS, local control, the convex hull property, the ability to render conic sections accurately using weights, invariance with respect to coordinate transformations and significant data compression. These and other aspects, features and advantages of the present invention will be more readily understood from the subsequent detailed description.

BRIEF DESCRIPTION OF THE DRAWINGS

The subject matter which is regarded as the invention is particularly pointed out and distinctly claimed in the concluding portion of the specification. The invention, however, both as to apparatus and process, may best be understood by reference to the following detailed description taken in conjunction with the accompanying drawings in which:

FIGS. 6a and 6b present a flowchart operations of a curve evaluation system in accordance with the principles of the present invention;

FIGS. 7a–7c illustrate a stack of knots within each of the parallel floating point processors at various stages of operation;

FIGS. 8a and 8b illustrate a stack within the graphics control processor at various stages of operation;

DETAILED DESCRIPTION

This invention relates to a system for drawing parametric curves based on non-uniform rational b-splines (NURBS) using parallel and pipelined processors to obtain high performance. For an extensive review of the related terms and mathematics see "An Introduction to Splines for Use in Computer Graphics & Geometric Modelling" by R.H. Bartels, J.C. Beatty, and B.A. Barsky (Morgan Kaufmann, 1987).

Briefly, non-uniform rational b-splines (NURBS) are a class of parametric functions, which are used to represent parametric curves. NURBS curves depend on a parametric coordinate (t), which increases monotonically as one moves from the start of a curve to the end. This parametric coordinate is in addition to the geometric coordinates (x,y,z). Therefore, for a 3-D curve, as an example, we have:

$$x = X(t)$$

$$y = Y(t)$$

$$z = Z(t),$$

where $X(t)$, $Y(t)$, and $Z(t)$ for $t_{min} \leq t \leq t_{max}$ are functions of the parametric coordinate t.

Parametric curves may also be defined in terms of simple polynomials, and any such parametric polynomial function may be represented exactly by a corresponding NURBS function.

NURBS curves may be defined in either rational or non-rational forms. In the non-rational form, each component (x,y,z) of a NURBS curve may be determined by evaluating a polynomial function of the parametric coordinate:

$$X(t) = \sum_{i=0}^{m} c_{xi} t^i$$

$$Y(t) = \sum_{i=0}^{m} c_{yi} t^i$$

$$Z(t) = \sum_{i=0}^{m} c_{zi} t^i$$

In the rational form, there is an additional function called the weight:

$$W(t) = \sum_{i=0}^{m} c_{wi} t^i.$$

In this case, the geometric coordinates are determined by ratios of polynomials:

$$X(t) = WX(t)/W(t)$$

$$Y(t) = WY(t)/W(t)$$

$$Z(t) = WZ(t)/W(t)$$

where WX(t), WY(t), WZ(t) are polynomials similar to those which specify X(t), Y(t) and Z(t) for the non-rational case.

Each NURBS function, may be characterized by the degree (m) corresponding to the highest power of the parametric coordinate, and the order (k), which equals m+1 corresponding to the number of linearly independent terms in a polynomial of degree m. Thus, for example, a quadratic function, $ax^2+bx+c$, has a degree 2 and order 3.

Figure 1:
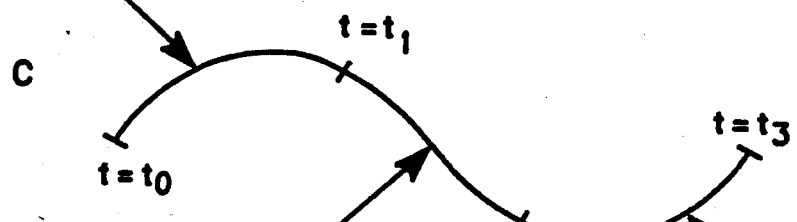
FIG. 1 is an illustration of a two dimensional curve composed of three successive spans each represented by a different set of polynomials.

A NURBS function may be represented by multiple sets of coefficients, each of which is valid only for a limited range of the parametric coordinate. Thus, a curve may be divided into a sequence of successive spans, each represented by different polynomials. This is illustrated by the 2 dimensional curve C in FIG. 1, which consists of three spans. The first span is defined by parameter values t running from $t_0$ to $t_1$, and the coordinates of this portion of the curve are determined by the polynomials:

$$X_1(t) = \sum_{i=0}^{m} c_{x1i} t^i$$

$$Y_1(t) = \sum_{i=0}^{m} c_{y1i} t^i$$

The second span is defined by parametric values t running from $t_1$ to $t_2$, and the coordinates of this portion of the curve are determined by the polynomials $$X_2(t) = \sum_{i=0}^{m} c_{x2i} t^i$$

$$Y_2(t) = \sum_{i=0}^{m} c_{y2i} t^i \text{ and so forth.}$$

Figure 2:
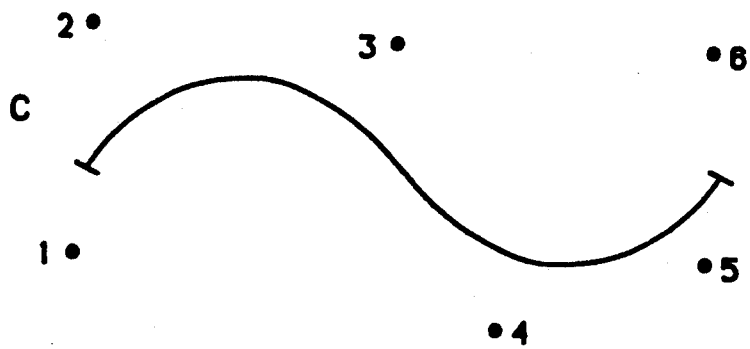
FIG. 2 is an illustration of a NURBS curve C and its six control points.

NURBS are determined by control points, weights, and knot vectors. The control points provide the primary control over the geometry of a curve. A curve may have n control points, where n must be greater than or equal to the order (k) of the curve. Each span of a curve has k control points. The control points determine the general shape of the curve, but the curve usually does not pass through these points. FIG. 2 illustrates a curve C with 6 control points labelled 1-6.

The weight values are only used to define the rational form of the NURBS curves. In the rational form, a weight (w) is associated with each of the coordinates (x,y,z) of the control points. The weights and coordinates are combined to form the homogeneous coordinates (wx,wy,wz,w), which define the control points for a set of four parametric polynomial functions, WX(t), WY(t), WZ(t), and W(t). The resulting geometric coordinates are determined by the ratios:

$$x(t) = WX(t)/W(t)$$

$$y(t) = WY(t)/W(t)$$

$$z(t) = WZ(t)/W(t)$$

The weights are required to be positive and greater than zero. The values of the weights are usually close to unity, and the rational form reduces to the non-rational form if the weights are all equal.

Figure 3:
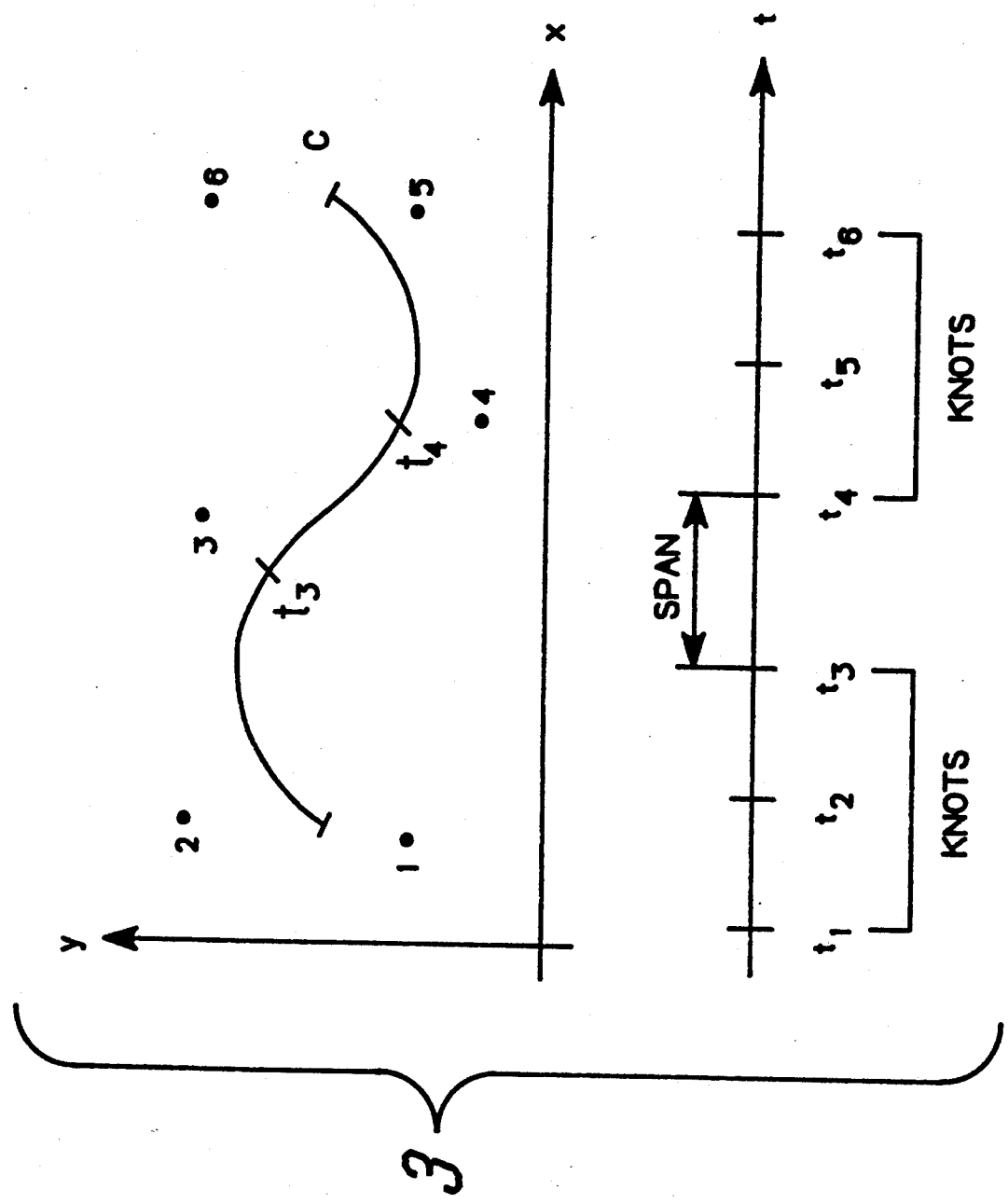
FIG. 3 is an illustration of a span ($t_3$-$t_4$) of curve C in two dimensional coordinate space and of the span and three knot values ($t_1$, $t_2$, $t_3$) preceding it and three knot values ($t_4$, $t_5$, $t_6$) following it in parameter space.

The knot vectors for a curve define a partitioning of the parameter space for the parametric coordinate (t). The knot vector for a curve of order k with n control points will have n+k components, of which the first and last are never used. Each span in the curve depends on 2m successive knot values, where m=k−1 and k is the order of the curve. These knot values are divided into two groups: one having m knot values preceding the span and the other having m knot values following the span. For an illustration, see FIG. 3 in which a span ($t_3$-$t_4$) of curve C has 3 knot values ($t_1$, $t_2$, $t_3$) preceding the span and 3 knot values ($t_4$, $t_5$, $t_6$) following the span. The knot values will determine if the b-spline is uniform or non-uniform. If the values of the knots are spaced uniformly (for example, 0, 1, 2, 3), then the result is a uniform b-spline. For a non-uniform b-spline, the knot values may be separated by irregular intervals, and knot values may be repeated, as in the knot vector (0.0, 1.2, 1.5, 1.5, 2.7, 9.0).

In this description, the term NURBS is used generically and is meant to encompass the special cases of non-rational (weights set equal to 1) and uniform b-splines.

Figure 4:
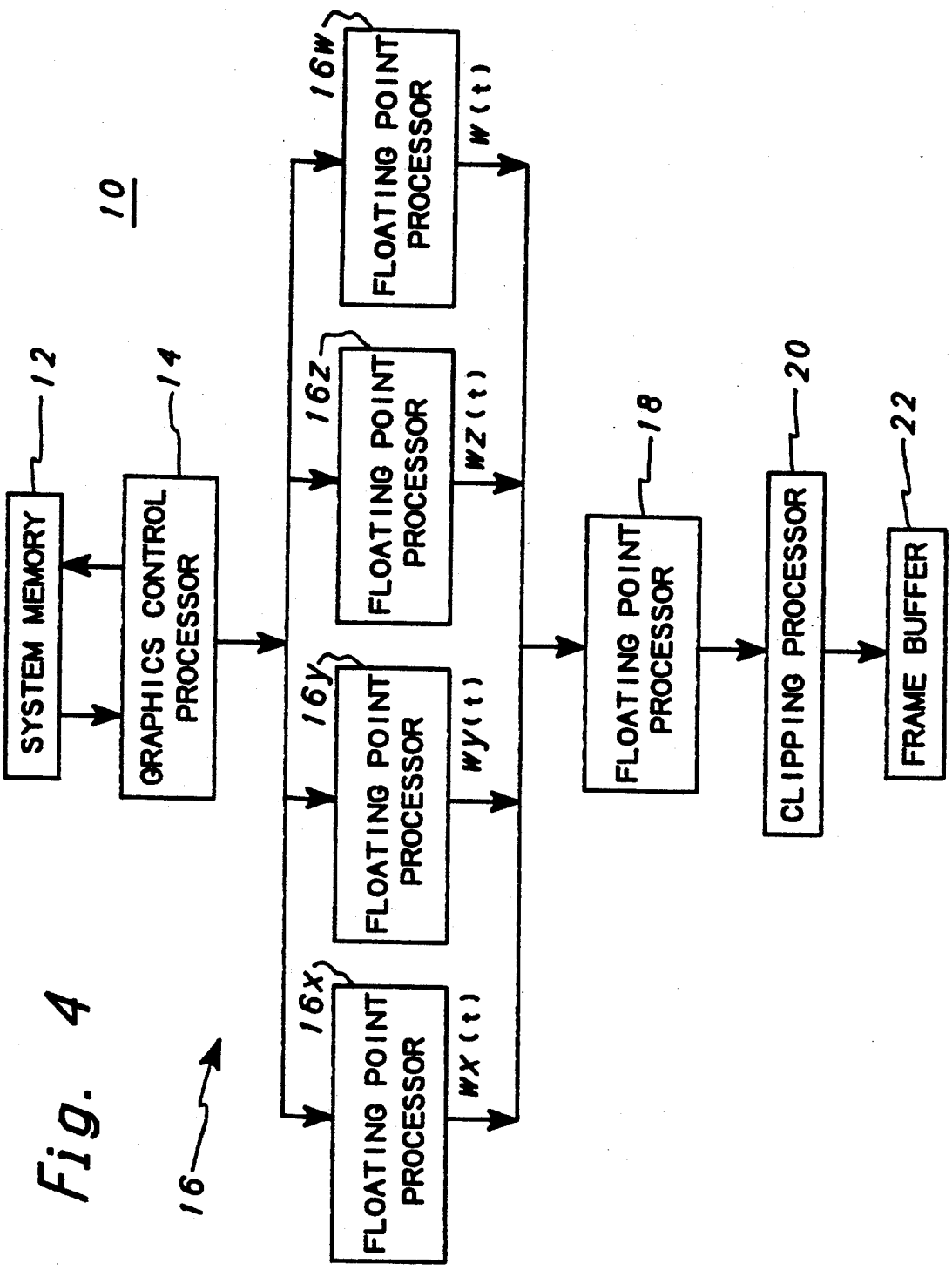
FIG. 4 is a block diagram showing the component parts and interconnection of a curve evaluation and rendering apparatus constructed in accordance with the principles of the present invention.

With this basic understanding of the underlying mathematics, a preferred embodiment of the invention will now be described. A curve evaluation and rendering system (10) constructed in accordance with the principles of the present invention, is represented in FIG. 4, and includes the following principal components:

(1) System Memory (12);
(2) A Graphics Control Processor (14); and, operating in pipeline fashion:
(3) A group (16) of four floating point processors (16x, 16y, 16z and 16w) arranged in parallel;
(4) A further floating point processor (18) connected to the outputs of the parallel floating point processors (16);
(5) A clipping processor (20); and
(6) A frame buffer (22).

The system memory (12) contains the NURBS data for each parametric curve. The data is stored in memory 12 and is transmitted to the graphics control processor (14) in a structured arrangement or sequence that permits the sharing of data by successive spans, thereby eliminating data redundancy.

Figure 5:
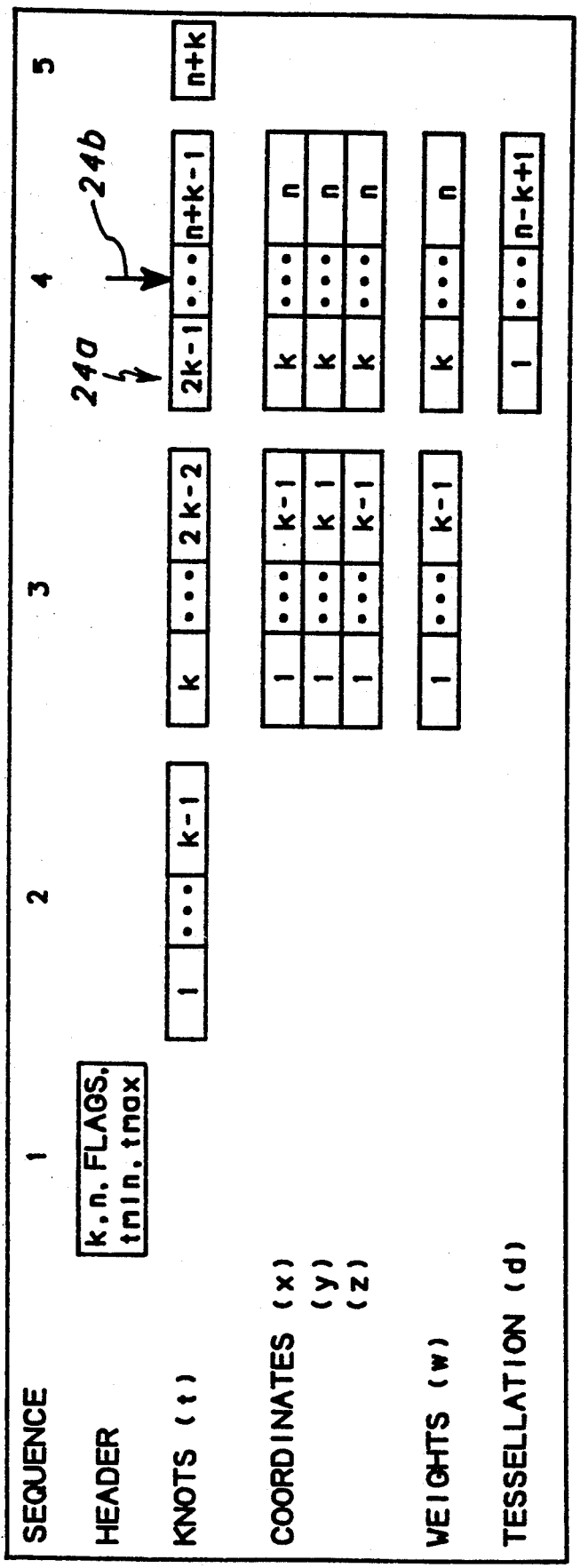
FIG. 5 represents the data structure for a three dimensional NURBS curve as it is stored in system memory.

Referring to FIG. 5, the structured arrangement of data is indicated by the sequence portions or divisions 1-5. At sequence portion one, prefatory header information is located in system memory. The header information includes: the order (k), where k is an integer from 2 to kmax, where kmax is the maximum order supported by the floating point processors; number of control points (n), which must be ≧k; curve type flag, which may be 1 for non-rational, 0 for rational; curve status flag, which may be 0 for tessellation parameters undefined, 1 for tessellation parameters defined; tmin and tmax, which specify the range of the parametric coordinate. Tessellation parameters will be explained subsequently.

At sequence portion two, the values of initial knots 1 through k−1 of the curve, are located in system memory.

At sequence portion 3, the values of the k through 2k−2 knots, x, y and z coordinates of successive control points 1 through k−1, and associated weights for control points 1 through k−1, are located in system memory. This data is grouped as depicted by the vertical columns; each vertical column in FIG. 5 comprises an individual data set or record.

Sequence portion 4 contains similar successive data sets or records, each augmented by tessellation parameter (d). Each successive data record of sequence portion 4 will complete a successive span of the curve. A span is defined by k control points and $2k-2$ knots. Knot 1, in sequence portion 2, is not used for curve evaluation. Thus, the column or data record labelled 24a, containing knot value $2k-1$, control point coordinates x(k), y(k), z(k), weight w(k), and tessellation data d(1), along with the data records of sequence portion 3, and the knot values for knots 2 through $k-1$ of sequence portion 2, complete the first span. The second span is completed by the second set or column of data of sequence 4 along with the prior $2k-3$ columns of data (i.e. prior $k-1$ control points and associated weights, and $2k-3$ knot values). Subsequent spans are similarly constructed. By processing in this manner, where each new span uses one succeeding data set of sequence 4 and the immediately preceding $2k-3$ data records previously stored, redundancy of data is eliminated.

At sequence portion 5, the final knot value n+k is located in system memory. However, this knot is not used in the curve evaluation process.

Referring again to FIG. 4, the graphics control processor (14) reads the data stored in system memory (12), in the sequence previously explained, and can write data back to system memory, as indicated by the two-way arrows shown in FIG. 4. The graphics control processor transforms control point data from modeling coordinates to view coordinates, converts the transformed control point data to homogeneous coordinates (wx, wy, wz, w), determines a parametric coordinate interval (dt) for tessellating the parametric coordinate, generating a series of interval spaced parameter points (PC), and also transmits commands and data to the four parallel floating point processors (16), as more fully explained hereinafter. Processors 16x, 16y, 16z and 16w independently, simultaneously and synchronously evaluate the b-spline functions of a respective one of the homogeneous coordinates wx, wy, wz and w for each parameter point PC. The outputs wx(t), wy(t), wz(t) and w(t) from processors 16x, 16y, 16z and 16w, respectively, are provided in series to floating point processor 18. Processor 18 calculates the reciprocal of w(t) and multiplies wx(t), wy(t) and wz(t) by this reciprocal to determine the corresponding geometric coordinates x, y, z of vertices of the polyline representative of the curve. The polyline coordinates are processed in known fashion by clipping processor 20 (i.e. vectors defined by each sequential pair of vertices are clipped to the current viewing window) and sent to frame buffer 22 for rendering of the curve upon a monitor screen (not shown) of the computer graphics display, in conventional fashion.

A particular implementation of the present invention will now be described. System memory 12 can comprise 2 to 4 Mbytes (or more) of random access memory (RAM). The system memory must be capable of holding the data for at least one parametric curve and typically contains a display list composed of various graphics elements, i.e. primitives and attributes, including NURBS curves. Graphics control processor 14 includes: a floating point multiplier; a floating point adder, also used as an accumulator for the multiplier; a sequencer; ability to access at least 32k code memory; ability to access at least 32k data memory; 32 integer registers; and 32 registers for floating point operation. Processor 14 can be advantageously embodied by a 10 MHz Weitek chip set (a XL—8136 programmable sequencer, a XL—3132 floating point processor unit, and XL—8137 integer processing unit, working together) available from Weitek of Sunnyvale, Calif.

Floating point processors 16x, 16y, 16z, 16w and 18 can each be a VLSI processor with 32-bit floating point capability. Each of these processors includes a floating point multiplier; a floating point adder, also used as an accumulator for the multiplier; a simple sequencer; RAM for microcode; FIFO for input and output for interface; and sixty-four registers for storing data. Floating point processors are known generally in the art. Commonly assigned U.S. patent application Ser. No. 331,021, filed Mar. 28, 1989, discloses an invention which provides special input and output FIFOs for advantageous parallel and/or pipelined interconnection in the manner herein described, and is hereby incorporated herein by reference. Clipping processor 20 and frame buffer 22 may each contain multiple similar processors in any number and configuration which provides adequate performance.

In general, when a NURBS curve is encountered in the display list of memory 12, the control points are transformed by the graphics control processor 14. The resulting transformed control points are converted to homogeneous coordinates (wx, wy, wz, w) and sent to the pipelined parallel processors 16 where individual coordinates are retained by respective processors 16x, 16y, 16z and 16w. The graphics control processor 14 then determines how to tessellate the parametric coordinate (t) and sends a series of parameter values PC to the pipeline. Processors 16 simultaneously evaluate the wx, wy, wz, and w components in parallel for each of these values of the parametric coordinate. The resulting values of wx(t), wy(t), wz(t), and w(t) are passed to processor 18 which converts them to (x, y, z) coordinates. Each point is subsequently processed as if part of an ordinary polyline by clipping processor 20 and frame buffer 22. The particular organization of the NURBS data in memory 12 and processing thereof by the above described pipelined apparatus, affords the numerous benefits of the present invention.

The particular operations of the graphics control processor 14, as well as the operation of the other processors in the curve evaluation system 10 are shown in flowcharts of FIGS. 6A–6D and will now be explained in detail.

Referring to FIG. 6A, the header information which includes the order (k), number of control points (n), curve type flag, curve status flag, tmin and tmax, is read from system memory (operation 30) and stored in registers within the graphics control processor 14. A register, called counter, will be used to keep track of the number of control points processed, and will initially be set to zero (operation 32).

Next, the graphics control processor will send the command "Start Parametric Curve" (operation 34) and the order (k) (operation 36) to each of the parallel floating point processors (16).

Then, the graphics control processor will read from system memory $k-1$ initial knots (operation 38) and will transmit these values to all of the parallel floating point processors (16). A stack 39 within each of the parallel floating point processors will hold the knot values transmitted to said processors. Each stack 39 will be large enough to hold $2k-2$ rows of data, and it will operate in a first in-first out (FIFO) manner. FIG. 7a is an illustration of such a stack where as an example, k=4. As can be seen from the illustration, the first k−1 knots were pushed on the stack and the rest of the stack is initially unused.

Next, a data record containing a knot value (t(k)), a control point (x(1), y(1), z(1)), a weight (w(1)), and tessellation data, if available, will be read from system memory (operation 40). The counter will be updated by 1 (operation 42), and if the curve type is equal to 1 (inquiry 44), then the weight for each data record will be set to 1 (operation 46), which indicates a non-rational b-spline.

Then, the graphics control processor will transform the control point, which was just received from system memory, from modelling coordinates to view coordinates (x,y,z) (operation 48). A transformation matrix, previously loaded in the graphics control processor, will allow x,y,z to be translated, rotated and scaled as desired, in conventional manner.

After the transformation process, the graphics control processor will push the knot value (t), and control point coordinates (x,y,z) onto a stack 49 in local memory of the graphics control processor (operation 50). This stack 49 will be large enough to hold k rows of control point data, which is sufficient for one span, and will also operate on a FIFO basis. For an illustration of this local memory stack, see FIG. 8a, where k=4 and the first row of data has been pushed onto the stack and the rest of the stack is empty.

Next, in the graphics control processor, the control point coordinates (x,y,z) just read from system memory will be multiplied by a weight (w) yielding the weighted coordinates (wx,wy,wz,w) (operation 52).

Figure 9A:
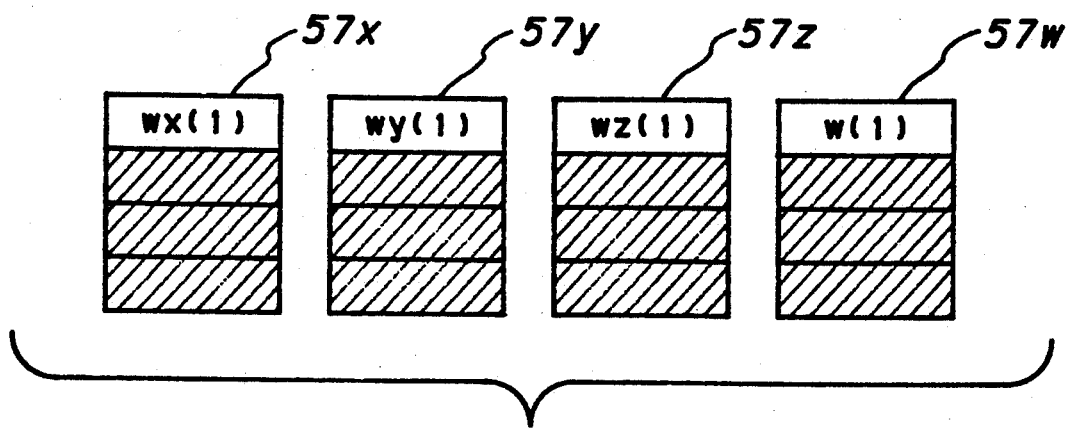
FIGS. 9a and 9b illustrate control point stacks within the individual parallel floating point processors at various stages.

Then, the graphics control processor will send the command "Start Span" (operation 54) to each of the parallel floating point processors (16). This command will be followed by the order (k), a knot value (t (k)), which will be pushed onto the knot stack 39 in each of the parallel floating point processors (see FIG. 7b for an illustration of how the knot stack will look after this value is pushed on), and the weighted coordinates (wx,wy,wz, and w) (operation 56). Each component of the coordinate set (wx,wy,wz,w) will be transmitted to only one floating point processor. Therefore, wx will be sent to the first parallel floating point processor (16x), wy will be sent to the second parallel floating point processor (16y), and so forth. Within each of these parallel processors, a stack 57 is used to hold the individual component of the coordinate set (wx,wy,wz,w). Each stack can hold up to k rows of data and operates in a FIFO manner. FIG. 9a is an illustration of individual stacks 57x, 57y, 57z and 57w within the respective parallel floating point processors 16, with the respective initial weighted coordinate pushed therein.

Figure 9B:
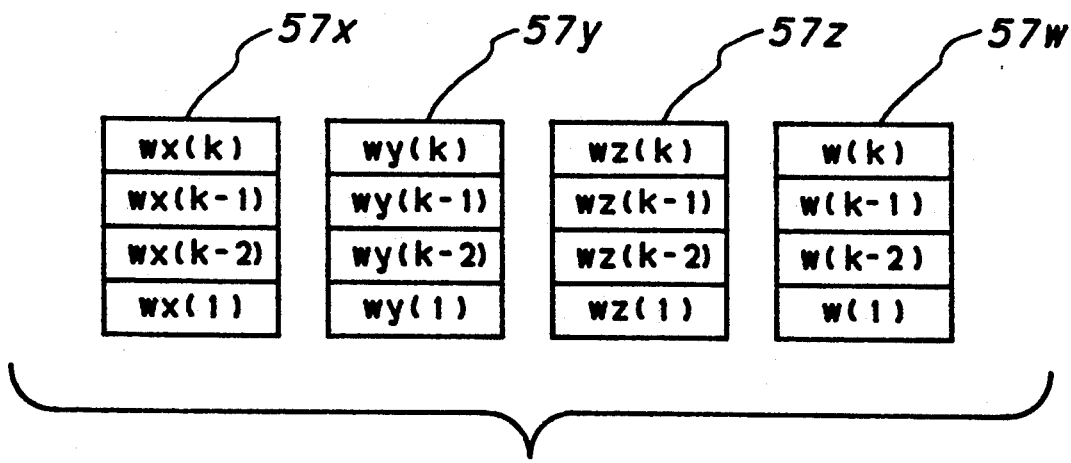

Then, it is determined if the counter is greater than or equal to k (operation 58). If it is not, then the flow will return to operation 40 (read 1 data record) via line (60). If it is equal to k, then enough data for one span has been sent to the floating point processors. Thus, the knot stack 39 within each of the parallel floating point processors 16 will have data for knots 2 through 2k−1, as represented in FIG. 7c; the stack 49 within the graphics control processor 14 will contain values for knots k through 2k−1 and coordinates (x,y,z) for control points 1 through k, as represented in FIG. 8b, where k=4; and each weighted coordinate stack 57 within the appropriate parallel floating point processor 16 will have weighted coordinate data for control points 1 through k, as represented in FIG. 9b, where k=4.

After enough data for one span has been sent to each of the floating point processors 16, the validity of the span will be determined (operation 62). A span is valid if:

$T_1 < T_{max}$
$T_2 > T_{min}$ and
$T_2 > T_1$ where $T_1$ is equal to the first knot value and $T_2$ is equal to the second knot value on the stack 49 in the graphics control processor 14.

If the span is invalid, then the flow will once again return to operation 40 (read 1 data record) via line 64. If the span is valid and the curve status flag is 0 (operation 65), then the tessellation parameter (d) will be calculated by graphics control processor 14 (operation 66) and that value will be saved in system memory (operation 68). If the curve status flag is not equal to 0, then the flow will skip to 70 (calculate dt) via line 67, which signifies that the tessellation parameter has already been calculated.

Figure 10A:
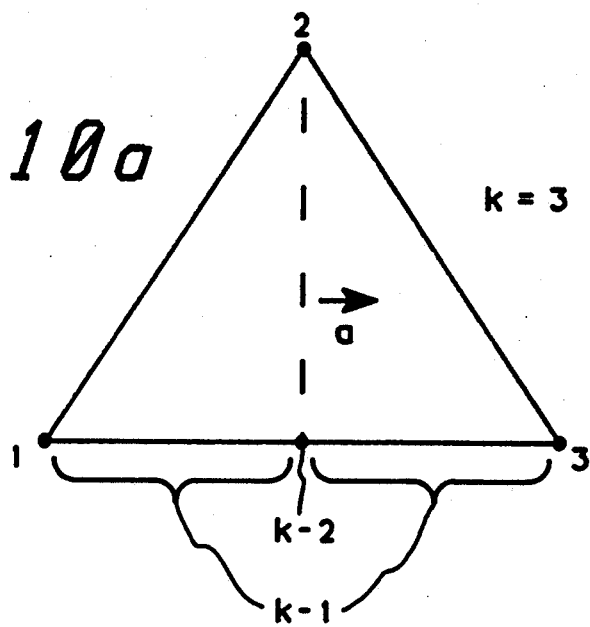
FIGS. 10a and 10b are illustrations useful in understanding how to calculate the tessellation parameter used in the present invention.
Figure 10B:
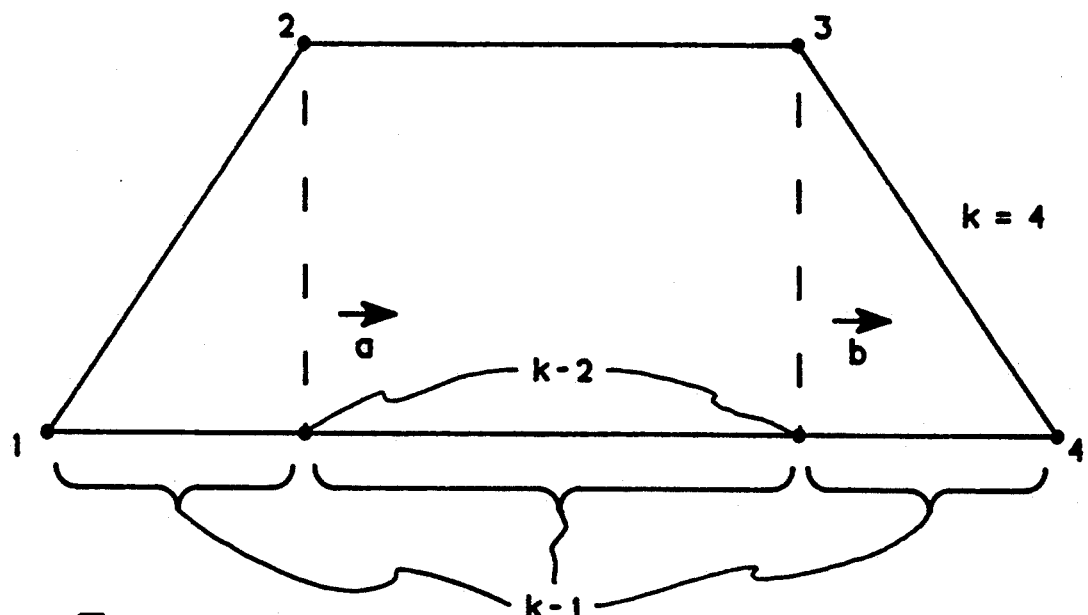

Tessellation is the process by which a curved line is divided into segments, which may be approximated with straight lines. The calculation of the tessellation parameter is dependent on the number of points in a span, which is defined by the order of the curve. As illustrated in FIGS. 10a and 10b, a curve of order k, has k control points per span and k−1 sections. The k control points consist of 2 end points and k−2 intermediate points. Therefore, if k=3, there would be 2 sections and 1 intermediate point yielding d=|ax|+|ay|+|az| where: d is a bound on the length of vector a and ax, ay, az are the bounds on the chordal deviation. If k=4, there would be 3 sections and 2 intermediate points yielding $$d = |ax| + |bx| + |ay| + |by| + |az| + |bz|$$

where d is a bound on the lengths of vectors a and b and ax, ay, az and bx, by, bz are the bounds on the chordal deviation.

After the tessellation parameter (d) is calculated, a parametric coordinate interval, called dt, will be calculated by the graphics control processor 14 (operation 70), as follows:

$$dt = (T_2 - T_1)/NStep$$

where NStep is determined by:
(a) calculating the scale, s, which equals the ratio of screen (pixel) coordinates/data coordinates;
(b) converting d into pixel units, which are device coordinates by multiplying d by s yielding d';
(c) calculating NStep $$NStep = Max(1, Int\ SQRT(d'))$$

Figure 6B:
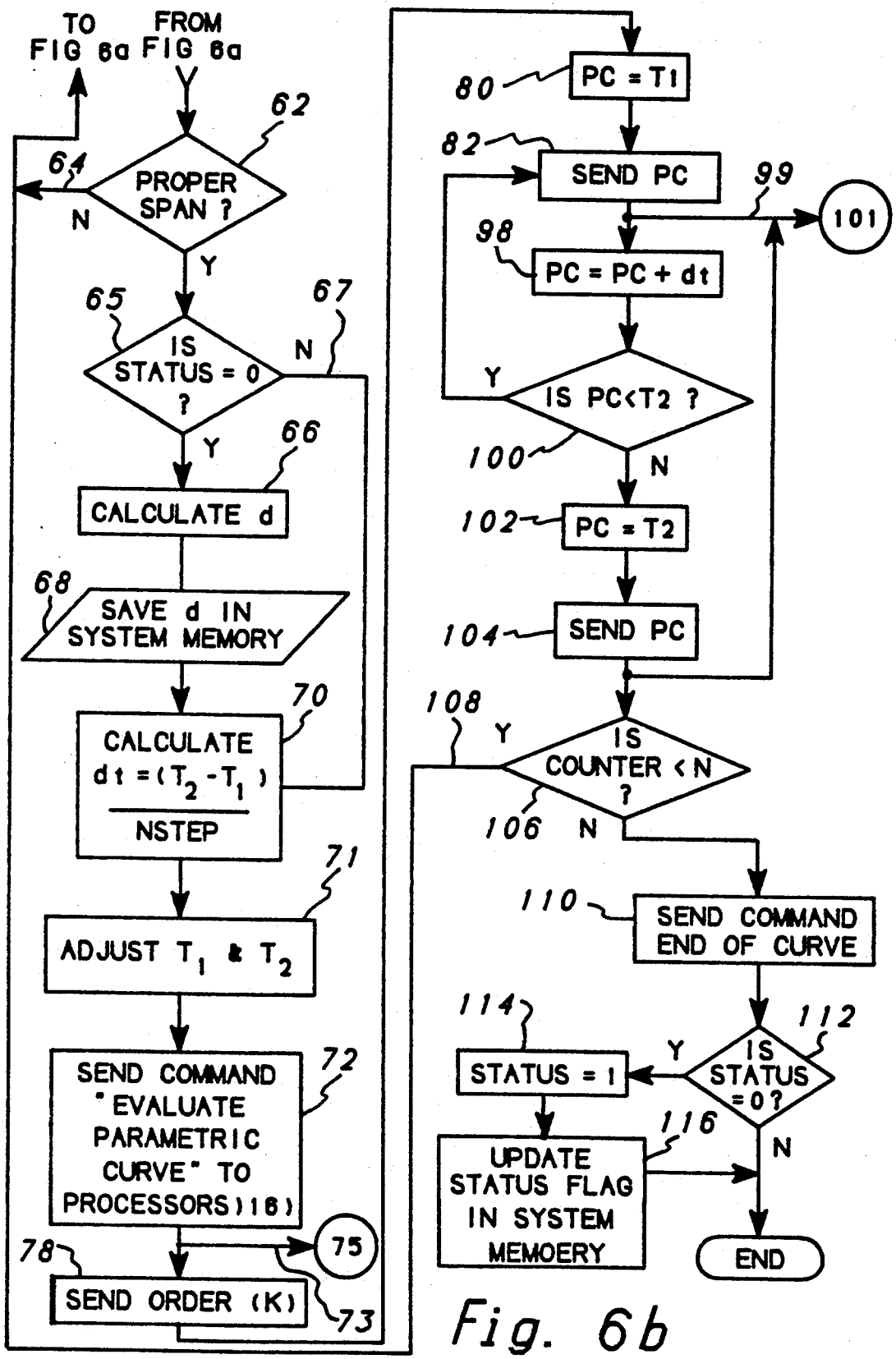
Figures 6C, 6D:
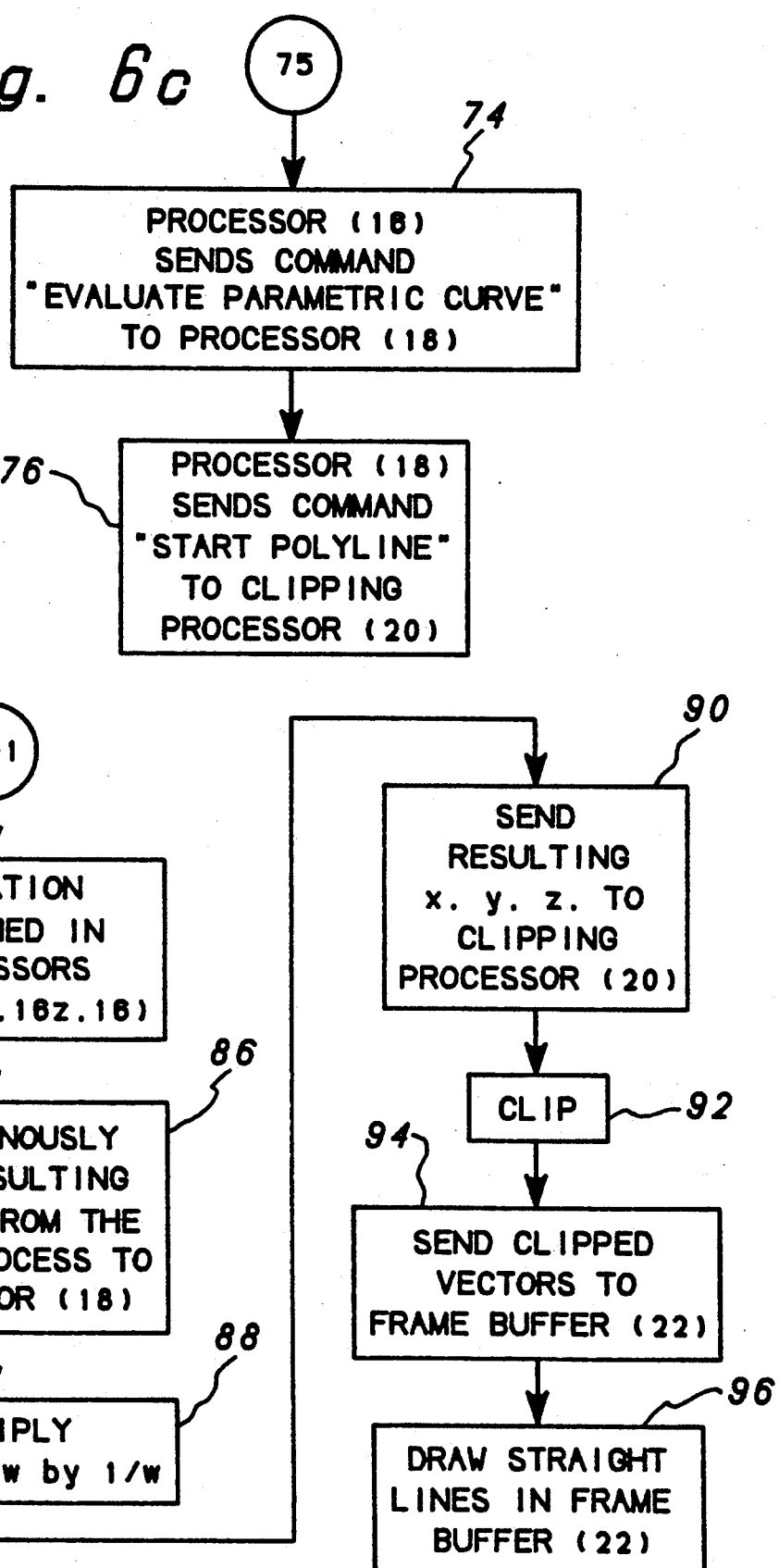
FIG. 6c presents a flowchart of the commands sent by the parallel floating point processors and the next processor in pipeline.
FIG. 6d presents a flowchart of the operations within the parallel floating point processors and subsequent processors in accordance with the principles of the present invention.

After dt is calculated, $T_1$ and $T_2$ will be adjusted to fit within the boundaries of $T_{min}$ and $T_{max}$ as follows: If $T_{min}$ is between $T_1$ and $T_2$, then set $T_1$ equal to $T_{min}$, and if $T_{max}$ is between $T_1$ and $T_2$, then set $T_2$ equal to $T_{max}$ (operation 71). Then, the graphics control processor will send the command "Evaluate Parametric Curve" to the parallel floating point processors 16 (operation 72). When the parallel floating point processors receive this command, they in turn send the command "Evaluate Parametric Curve" to the floating point processor 18 (operation 74) which then sends the command "Start Polyline" to the clipping processor (20) (operation 76). This is illustrated in FIG. 6c. While these commands are being sent, the graphics control processor continues to work. This is indicated in FIG. 6b by line 73. The graphics control processor sends the order (k) to the parallel floating point processors 16 (operation 78). Then, a parameter point (PC) will be initialized to $T_1$, which is the first knot value of a span (operation 80), and PC will be sent to each of the parallel floating point processors (operation 82).

The operations which take place within the parallel processors and subsequent processors will best be understood by referring to FIG. 6d. The tasks in these processors are performed while the graphics control processor continues to work. This is illustrated by line 99 in FIG. 6b. Referring to FIG. 6d, after the parameter point (PC) is sent to each of the parallel floating point processors, each processor will begin evaluating the b-spline functions for one component of the control point coordinate set (wx,wy,wz,w) (operation 84). For example, the first parallel floating point processor 16x will evaluate the x coordinate of the parameter point, the second parallel floating point processor 16y will evaluate the y coordinate, and so forth. All four of the parallel floating point processors 16 evaluate their respective coordinates simultaneously.

In a preferred embodiment, a process known in the art as the Cox-DeBoor (or DeCasteljau) process is employed for evaluation. This process performs a linear interpolation between the components of the control points. A total of k (k−1)/2 interpolations will be performed for each value of PC sent to the floating point processor for each coordinate.

Figure 11A:
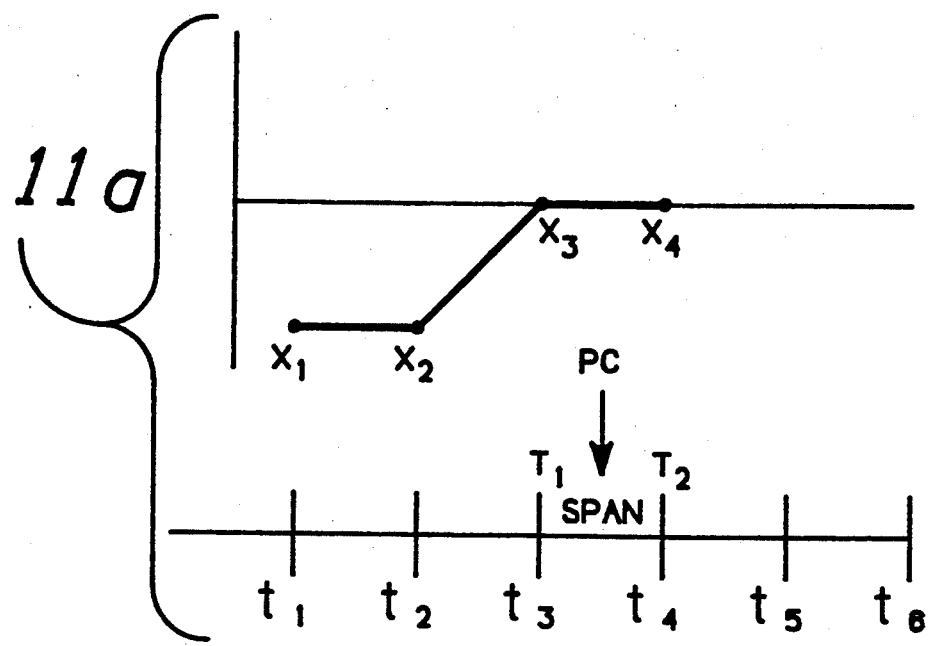
FIGS. 11a–11f depict the application of the Cox-DeBoor evaluation method preferably used in the present invention.

In order to illustrate this process, an example will be given for a cubic curve. FIG. 11a depicts the x coordinates of k control points, where k=4; a span beginning at knot value T and ending at knot value $T_2$, where $T_1$ and $T_2$ represent the first and second knot values respectively on the stack 49 in the graphics control processor (for an illustration of this stack, see FIG. 8b); a parameter point, PC, three knot values before the span ($t_1$, $t_2$, $t_3$) and three knot values after the span ($t_4$, $t_5$, $t_6$). The six knot values, $t_1$–$t_6$ represent the knot values on the stack 39 in each of the floating point processors (for an illustration of this stack, see FIG. 7c).

Figure 11B:
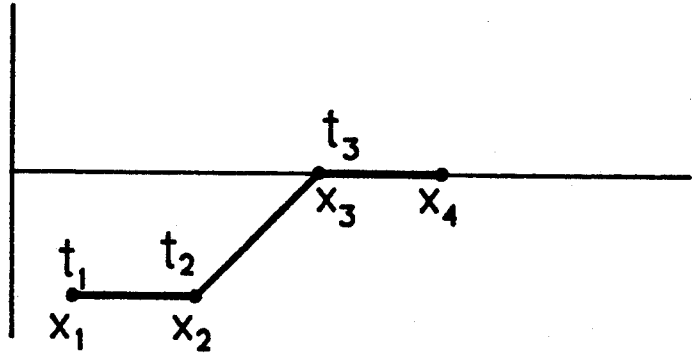
Figure 11C:
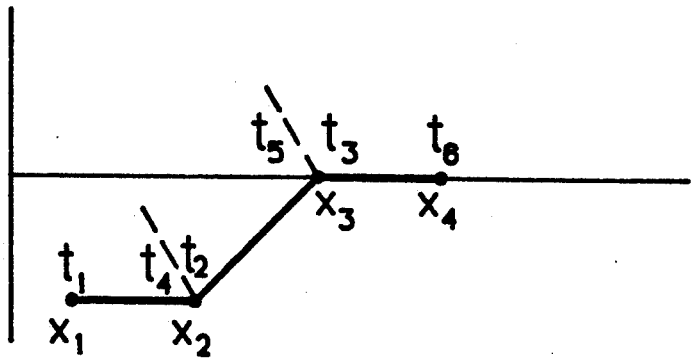

FIG. 11b is an illustration of the positioning of the before knots ($t_1$, $t_2$, $t_3$), which represent the beginning of each piece to be interpolated, and FIG. 11c is an illustration of the positioning of the after knots ($t_4$, $t_5$, $t_6$), which represent the end of each piece to be interpolated. Therefore, an interpolation will be performed between $t_1$ and $t_4$, $t_2$ and $t_5$, and $t_3$ and $t_6$.

The Cox-DeBoor evaluation process uses the above-mentioned variables in the following equations. The example below is for a cubic curve:

$$f_1 = ((t_4 - PC)x_1 + (PC - t_1)x_2)/(t_4 - t_1)$$

$$f_2 = ((t_5 - PC)x_2 + (PC - t_2)x_3)/(t_5 - t_2)$$

$$f_3 = ((t_6 - PC)x_3 + (PC - t_3)x_4)/(t_6 - t_6)$$

Figure 11D:
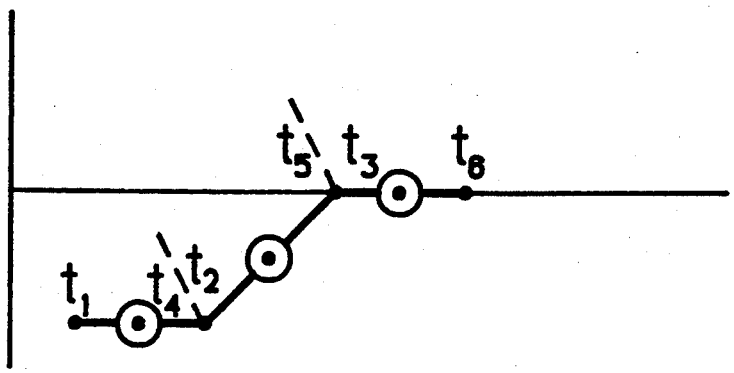

The above 3 equations are used in the first stage of linear interpolations for a cubic curve. An interpolation is performed between $t_1$ and $t_4$, $t_2$ and $t_5$, and $t_3$ and $t_6$ in order to yield 3 points. These 3 points are illustrated in FIG. 11d by a circle with a point inside the circle.

The second stage of interpolation requires a repositioning of the knot values. At this stage, we only have 3 points, therefore we only require knots $t_2$ through $t_5$. Knots $t_2$ and $t_3$ are the new before knots and $t_4$ and $t_5$ are the new after knots. The following two equations are used during this second stage of linear interpolations for a cubic curve:

$$f_1 = ((t_4 - PC)f_1 + (PC - t_2)f_2)/(t_4 - t_2)$$

$$f_2 = ((t_5 - PC)f_2 + (PC - t_3)f_3)/(t_5 - t_3)$$

Figure 11E:
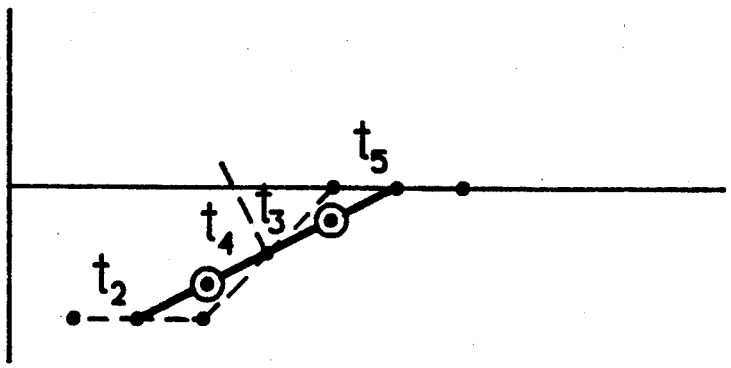

An interpolation is performed between $t_2$ and $t_4$, and $t_3$ and $t_5$ to yield 2 points. These 2 points are illustrated in FIG. 11e by a circle with a point inside the circle.

The last stage of interpolation again requires a repositioning of the knot values. At this stage we have only 2 points, therefore we only require knots $t_3$ and $t_4$. The following equation is used to yield the x coordinate of a point on the cubic curve.

$$f(t) = ((t_4 - PC)f_1 + (PC - t_3)f_2)/(t_4 t_3)$$

Figure 11F:
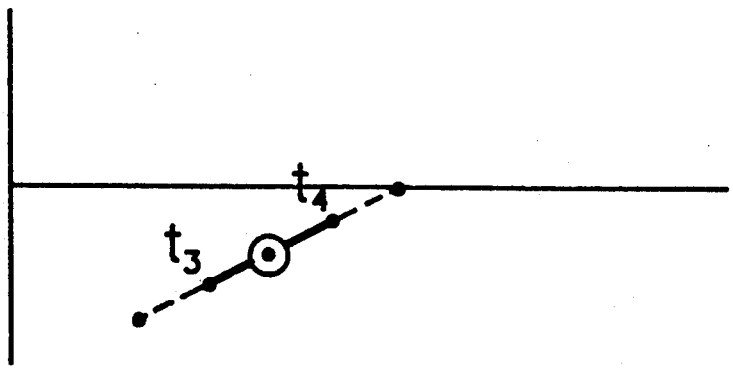

This point is illustrated in FIG. 11f by a circle with a point inside the circle. The above evaluation process is performed simultaneously on each coordinate (x,y,z,w) within the respective parallel floating point processor utilizing the same PC value, and the same knot values. However, each processor works on only one coordinate of the control point. The first processor 16x works on the x coordinate, the second processor 16y on the y coordinate, and so forth.

After the interpolation is complete for each coordinate value of PC, the parallel floating point processors 16 will send the resulting coordinate values (wx(t), wy(t), wz(t), w(t)) to floating point processor 18 in a synchronized manner such that these coordinate values are received in series (operation 86). Upon receiving each set of coordinate values, this processor 18 will compute 1/w(t) and multiply this by (wx(t), wy(t), wz(t), w(t)) (operation 88) to obtain the geometric coordinates (x,y,z). These coordinates are then sent to the clipping processor 20 (operation 90).

The clipping processor receives the coordinates sent by the processor 18, and clips the vectors defined by each sequential pair of coordinates to the current viewing boundaries (operation 92). These resulting sets of clipped vectors are sent to the frame buffer 22 (operation 94) where they are drawn as straight line segments (96).

Referring to FIG. 6d, the above evaluation process and subsequent steps are performed NStep+1 times, with each PC being incremented by a value of dt until PC ≧ $T_2$. (operation 98) If PC becomes greater than $T_2$ (operation 100), then PC will be set equal to $T_2$ (operation 102) and this last value will also be sent to the parallel floating point processors as previously explained (operation 104).

After all values of PC have been evaluated, the counter is examined to see if it is less than the number of control points (operation 106). If it is, then the flow returns to operation 40 (read 1 data record) via line 108, and the whole process is repeated until it is completed n times.

After the process has been completed n times, the graphics control processor 14, sends the command "End of Curve" (operation 110) to the parallel floating point processors 16.

Then, the status flag is analyzed (operation 112) and if it equals zero, it is updated to one (operation 114). This change is then written back to the system memory (operation 116).

An apparatus and method for evaluating and rendering parametric curves based on non-uniform rational b-splines (NURBS) using parallel and pipelined processors have been described herein. The deliberate use of processors in a parallel and pipelined manner enable curves to be evaluated and rendered much more quickly than in the past. Also, the particular organization of the data stored in system memory chosen for this invention permits the elimination of data redundancy and facilitates the efficient processing of the data.

NURBS because of their inherent characteristics provide many advantages, and the present invention fully utilizes those advantages. NURBS allow curves to be divided into sequences of spans, in which each span is represented by a different set of parametric polynomials. The parametric polynomials which describe adjacent spans of a NURBS curve provide a specific degree of continuity. The degree of continuity may be controlled so that a smooth curve or a curve with sharp corners may be drawn. The ability to match successive spans with a specified degree of continuity enables the construction of a complex curve passing through many points using low order NURBS. This property is extremely valuable because it makes it possible to avoid high order functions, which are usually costly to evaluate and prone to numerical instabilities.

Another characteristic of NURBS is local control. Since NURBS are determined by control points, weights and knot vectors, it is possible to alter a span of the curve by moving a control point without affecting the whole of the curve.

The convex hull property offers further advantages. NURBS curves are contained within the convex hull of their control points. The convex hull is the smallest convex polygon (for a 2-dimensional case) or the smallest convex polyhedron (for a 3-dimensional case) which contains a given set of points. Each span of a curve must lie within the convex hull of the k control points which determine that span. This characteristic makes it possible to make estimates of and place bounds on the size and location of a NURBS curve without evaluating any points. This is particularly important in trivial rejection testing. In other words, if the convex hull does not overlap with the current screen, then the curve is not evaluated and it is rejected. If the curve is not rejected, then the convex hull may be used to determine the points at which the curve is evaluated.

The weights associated with the control points provide exact representations of conic sections, which include circles and ellipses. This is a particularly important advantage since many objects require circular forms.

A further advantage of this invention is that transformations are accomplished using control points rather than vertices. Since there are usually fewer control points than vertices, this method is more economical.

The evaluation technique employed by the present invention uses the control points directly which results in reduced set-up cost. The interpolation formulas preserve the numerical stability of the NURBS functions, and each point is computed independently, so there are no cumulative errors as the calculations progress across a span. Consequently the last point on a curve will be just as accurate as the first, and each span will match the next with maximum accuracy.

NURBS curves form very compact data structures resulting in significantly improved data transfer rates, better use of system resources and the ability to support more complex graphics, as compared to the traditional polyline data. These advantages are preserved by processing the NURBS data in its original form and enhanced by the span sharing data sequencing approach of the present invention.

As can be seen from the foregoing, the apparatus and method for evaluating and rendering parametric curves based on NURBS, disclosed herein, have many advantages, which include high performance, good numerical stability, cost effectiveness, high speed and accuracy, greater control over the curves, compatibility with the proposed PHIGS PLUS standard for interactive 3-D graphics, and the elimination of data redundancy.

Although a preferred embodiment has been depicted and described in detail herein, it will be apparent to those skilled in the relevant art that various modifications, additions, substitutions and the like can be made without departing from the spirit of the invention, and these are therefore considered to be within the scope of the invention as defined by the appended claims.

What is claimed is:

1. Apparatus for converting non-uniform rational b-spline (NURBS) data representative of a parametric curve to geometric coordinates for subsequent rendering and display by a computer graphics system, said curve having parameter points (t) therealong and comprising one or more spans, each span being defined by control points and knot values, said NURBS data including control point data defining said control points and a knot vector defining said knot values, said apparatus comprising:

means for storing said NURBS data as a sequence of data records such that each successive span of the curve is defined by a corresponding individual data record in conjunction with a predetermined number of immediately preceding data records of the sequence;

a graphics control processor (14) for reading the data records in said sequence and for converting the control point data included in said NURBS data to homogeneous coordinates (wx, wy, wz, w) to generate converted control point data;

a plurality of parallel floating point processors (16x, 16y, 16z, 16w), corresponding respectively to said homogeneous coordinates, for receiving said converted control point data and for simultaneously determining the homogeneous coordinates of said curve at each of said parameter points along the curve to produce outputs (wx(t), wy(t), wz(t), w(t)) representing said coordinates at said points, each of said processors determining the corresponding homogeneous coordinate of said curve at each of said parameter points; and a further floating point processor (18) for receiving the outputs of the parallel floating point processors and converting said outputs to geometric coordinates (x, y, z,) of said parameter points for subsequent rendering and display of the curve by said graphics system.

2. The apparatus of claim 1 wherein said sequence comprises:

prefatory data specifying the order k and number of control points n of the curve;

initial knot values for the curve;
a series of data sets associated with a first span of the curve, each set comprising an after knot and modeling coordinates and a weight for a control point;
a series of individual augmented data sets, each individual augmented data set completing a successive span of the curve, each augmented data set comprising a successive knot value, modeling coordinates and a weight for a successive control point, and a tessellation parameter; and
a final knot value for the curve.

3. The apparatus of claim 2 wherein said graphics control processor means:
first transforms modelling coordinates of control points to view coordinates and then converts the transformed coordinates to said set of homogenous coordinates; and
determines a parametric coordinate interval for tessellating the parametric curve; and
generates a series of interval spaced parameter points for use by the plurality of parallel floating point processors.

4. The apparatus of claim 3 wherein said graphics control processor means determines the parametric coordinate interval for successive spans of the curve based upon the tessellation parameters of the augmented data sets.

5. Apparatus for converting non-uniform rational b-spline (NURBS) data representative of a parametric curve to geometric coordinates for subsequent rendering and display by a computer graphics system, said curve having parameter points (t) therealong and comprising successive spans, each span being defined by control points and knot values, said NURBS data including control point data defining said control points and a knot vector defining said knot values, said apparatus comprising:
first memory means (12) for storing NURBS data defining successive spans of said curve as a sequence of data records such that each successive span of the curve is defined by a corresponding individual data record in conjunction with a predetermined number of immediately preceding data records of the sequence;
a graphics control processor (14) for converting said control point data to homogeneous coordinates (wx, wy, wz, w) to generate converted control point data;
second memory means (39, 49, 57x-57w), having a plurality of rows including a first row, for storing the NURBS data defining a particular span, said second memory means being updated for a new span by storing new data in said first row and shifting previously stored data into a subsequent row, said graphics control processor processing NURBS data stored in said second memory means;
means for transferring said data records from said first memory means to said second memory means for processing by said graphics control processor, said transferring means being initially operable to transfer the data records defining the first span of said curve from said first memory means to said second memory means for determination of the coordinates of the parameter points along said first span and being subsequently operable to transfer an additional data record from said first memory means to said second memory means for determination of the coordinates of the parameter points along each additional span;
a plurality of parallel floating point processors (16x, 16y, 16z, 16w), corresponding respectively to said homogeneous coordinates, for receiving said converted control point data and for simultaneously determining the homogeneous coordinates of said curve at each of said parameter points along the curve to produce outputs (wx(t), wy(t), wz(t), w(t)) representing said coordinates at said points, each of said processors determining the corresponding homogeneous coordinate of said curve at each of said parameter points; and
a further floating point processor (18) for receiving the outputs of the parallel floating point processors and converting said outputs to geometric coordinates (x, y, z) of said parameter points for subsequent rendering and display of the curve by said graphics system.

6. Apparatus as in claim 5 in which said second memory means comprises a stack (49) associated with said graphics control processor for storing the control points defining a span.

7. Apparatus as in claim 5 in which said second memory means comprises a stack (57x, 57y, 57z, 57w) associated with each of said parallel floating point processors for storing the corresponding homogeneous coordinates of the control points defining a span.

8. Apparatus as in claim 7 in which said graphics control processor generates said parameter points using said transformed control point data and transmits said parameter points to said parallel floating point processors.

9. Apparatus as in claim 5 in which said second memory means comprises a stack (39) associated with each of said parallel floating point processors for storing the knot values defining a span.

10. Apparatus for converting non-uniform rational b-spline (NURBS) data representative of a parametric curve to geometric coordinates for subsequent rendering and display by a computer graphics system, said curve having parameter points (t) therealong and comprising one or more spans, each span being defined by control points and knot values, said NURBS data including control point data defining said control points and a knot vector defining said knot values, said apparatus comprising:
a graphics control processor (14) for transforming said control point data from modelling coordinates to view coordinates to generate transformed control point data and for converting said transformed control point data to homogeneous coordinates (wx, wy, wz, w) to generate converted control point data;
a plurality of parallel floating point processors (16x, 16y, 16z, 16w), corresponding respectively to said homogeneous coordinates, for receiving said converted control point data and for simultaneously determining the homogeneous coordinates of said curve at each of said parameter points along the curve to produce outputs (wx(t), wy(t), wz(t), w(t)) representing said coordinates at said points, each of said processors determining the corresponding homogeneous coordinate of said curve at each of said parameter points; and
a further floating point processor (18) for receiving the outputs of the parallel floating point processors and converting said outputs to geometric coordinates (x, y, z,) of said parameter points for subsequent rendering and display of the curve by said graphics system.

11. Apparatus for converting non-uniform rational b-spline (NURBS) data representative of a parametric curve to geometric coordinates for subsequent rendering and display by a computer graphics system, said curve having parameter points (t) therealong and comprising one or more spans, each span being defined by control points and knot values, said NURBS data including control point data defining said control points and a knot vector defining said knot values, said apparatus comprising:

a graphics control processor (14) for converting said control point data to homogeneous coordinates (wx, wy, wz, w) to generate converted control point data;

a plurality of parallel floating point processors (16x, 16y, 16z, 16w), corresponding respectively to said homogeneous coordinates, for receiving said converted control point data and for simultaneously determining the homogeneous coordinates of said curve at each of said parameter points along the curve to produce outputs (wx(t), wy(t), wz(t), w(t)) representing said coordinates at said points, said parameter points being generated by said graphics control processor and transmitted to said parallel floating point processors, each of said processors determining the corresponding homogeneous coordinate of said curve at each of said parameter points; and a further floating point processor (18) for receiving the outputs of the parallel floating point processors and converting said outputs to geometric coordinates of said parameter points for subsequent rendering and display of the curve by said graphics system.

12. Apparatus for converting non-uniform rational b-spline (NURBS) data representative of a parametric curve to geometric coordinates for subsequent rendering and display by a computer graphics system, said curve having parameter points (t) therealong and comprising one or more spans, each span being defined by control points and knot values, said NURBS data including control point data defining said control points and a knot vector defining said knot values, said apparatus comprising:

a graphics control processor (14) for converting said control point data to homogeneous coordinates (wx, wy, wz, w) to generate converted control point data;

a plurality of parallel floating point processors (16w, 16x, 16y, 16z), corresponding respectively to said homogeneous coordinates, for receiving said converted control point data and for simultaneously determining the homogeneous coordinates of said curve at each of said parameter points along the curve to produce outputs (wx(t), wy(t), wz(t), w(t)) representing said coordinates at said points, each of said processors determining the corresponding homogeneous coordinate of said curve at each of said parameter points, one of said parallel floating point processors (16w) providing an output (w(t)) representative of a weight for each of said parameter points; and a further floating point processor (18) for receiving the outputs of the parallel floating point processors and converting said outputs to geometric coordinates (x, y, z) of said parameter points for subsequent rendering and display of the curve by said graphics system, said further floating point processor inverting said output of said one parallel floating point processor to obtain the reciprocal of said output and multiplying the outputs of the other parallel floating point processors by said reciprocal to obtain said geometric coordinates.

13. A method of converting non-uniform rational b-spline (NURBS) data representative of a parametric curve to geometric coordinates for subsequent rendering and display by a computer graphics system, said curve comprising successive spans with parameter points along said spans, said method comprising the steps of:

storing said NURBS data in a first memory means as a sequence of data records such that each successive span of the curve is defined by a corresponding individual data record in conjunction with a predetermined number of immediately preceding data records of the sequence;

initially transferring the data records defining the first span of said curve from said first memory means to a second memory means and determining the coordinates of the parameter points along said first span of said curve from the data records initially transferred to said second memory means;

for each successive span of said curve following said first span, transferring an additional data record from said first memory means to said second memory means and determining the coordinates of the parameter points along said span of said curve from said additional data record in conjunction with the data records previously transferred to said second memory means; and generating a straight line segment for each said span of said curve from said coordinates corresponding to said parameter points along each said span.

14. A method as in claim 13 in which said second memory means has a plurality of rows including a first row and is updated for a new span by storing new data in said first row and shifting previously stored data into a subsequent row.

15. The method of claim 13 wherein evaluation of points along a corresponding successive span employs a successive individual data record and 2k-3 immediately preceding data records, where k is the order of the parametric curve.

16. The method of claim 13 wherein each span of the curve is defined by k control points and 2k-2 knot values; and wherein said sequence comprises:

a first sequence portion specifying the order k and number of control points n of the curve;

a second sequence portion comprising knot values for the first through the k−1 knots of the curve;

a third sequence portion comprising k−1 successive sets of data, each set comprising coordinates and an associated weight w for a control point and a knot value, the data sets including data for the first through k−1 control points and k through 2k−2 knots of the curve;

a fourth sequence portion comprising n−k+1 additional successive sets of data, these data sets including data for the k through n control points and 2k−1 through n+k−1 knots of the curve; and a fifth sequence portion comprising a n+k knot value.

17. The method of claim 16 wherein each data set of the fourth sequence portion also includes a tessellation parameter.

18. The method of claim 13 wherein the sequence in which the NURBS data is organized comprises:
prefatory data specifying the order k and number of control points n of the curve;
initial knot values for the curve;
a series of data sets associated with a first span of the curve, each set comprising an after knot and modelling coordinates and a weight for a control point;
a series of individual augmented data sets, each individual augmented data set completing a successive span of the curve, each augmented data set comprising a successive knot value, modelling coordinates and a weight for a successive control point, and a tessellation parameter; and
a final knot value for the curve.

19. Apparatus for converting non-uniform rational b-spline (NURBS) data representative of a parametric curve to geometric coordinates for subsequent rendering and display by a computer graphics system, said curve comprising successive spans with parameter points along said spans, said apparatus comprising:
a RAM for storing NURBS data defining said curve as a sequence of data records such that each successive span of the curve is defined by a corresponding individual data record in conjunction with a predetermined number of immediately preceding data records of the sequence;
processing means for determining the coordinates of the parameter points along a particular span of said curve, said processing means having memory means associated therewith for storing NURBS data defining said span of said curve; and
means for transferring said data records from said RAM to said memory means for determination of the coordinates of said parameter points by said processing means, said transferring means initially transferring the data records defining the first span of said curve from said RAM to said memory means for determination of the coordinates of the parameter points along said first span and subsequently transferring an additional data record from said RAM to said memory means for determination of the coordinates of the parameter points along each additional span.

20. Apparatus as in claim 19 in which said memory means has a plurality of successive rows including a first row and is updated for a new span by storing new data in said first row and shifting previously stored data into a subsequent row.

21. Apparatus as in claim 20 in which each span is defined by control points, said memory means comprising a stack for storing the control points defining a span.

22. Apparatus as in claim 20 in which each span is defined by knot values, said memory means comprising a stack for storing the knot values defining a span.

* * * * *